United States Patent
Lechleider et al.

(10) Patent No.: US 6,876,726 B1
(45) Date of Patent: Apr. 5, 2005

(54) DETERMINING THE COMPOSITION OF PHYSICAL STRUCTURES FROM BOUNDARY MEASUREMENTS, INCLUDING THE COMPOSITION OF SUBSCRIBER LOOPS

(75) Inventors: Joseph William Lechleider, Morristown, NJ (US); John Terrance Peoples, Warren, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 823 days.

(21) Appl. No.: 09/676,801

(22) Filed: Sep. 29, 2000

Related U.S. Application Data

(60) Provisional application No. 60/158,156, filed on Oct. 8, 1999.

(51) Int. Cl.[7] .................. H04M 1/24; H04M 3/08; H04M 3/22

(52) U.S. Cl. .................. 379/27.01; 379/14.01; 379/22.03; 379/27.02

(58) Field of Search ................. 379/1.01, 1.04, 379/14.01, 15.03, 22, 22.01–22.02, 22.04, 22.03, 24, 27.01, 27.02–27.03, 30

(56) References Cited

U.S. PATENT DOCUMENTS 5,747,810 A * 5/1998 Schotland ............... 250/358.1
6,215,855 B1 * 4/2001 Schneider .................. 379/22
6,487,276 B1 * 11/2002 Rosen et al. ............. 379/1.04

* cited by examiner

*Primary Examiner*—Duc Nguyen
(74) *Attorney, Agent, or Firm*—Joseph Giordano

(57) ABSTRACT

A method for the direct estimation of configuration parameters defining the make-up of a physical system, such as cable lengths and gauges in the case of telephone subscriber loops, from boundary or end-point measurements of the physical structure, such as the impedance or return loss response of a subscriber loop, due to a probing source.

4 Claims, 4 Drawing Sheets

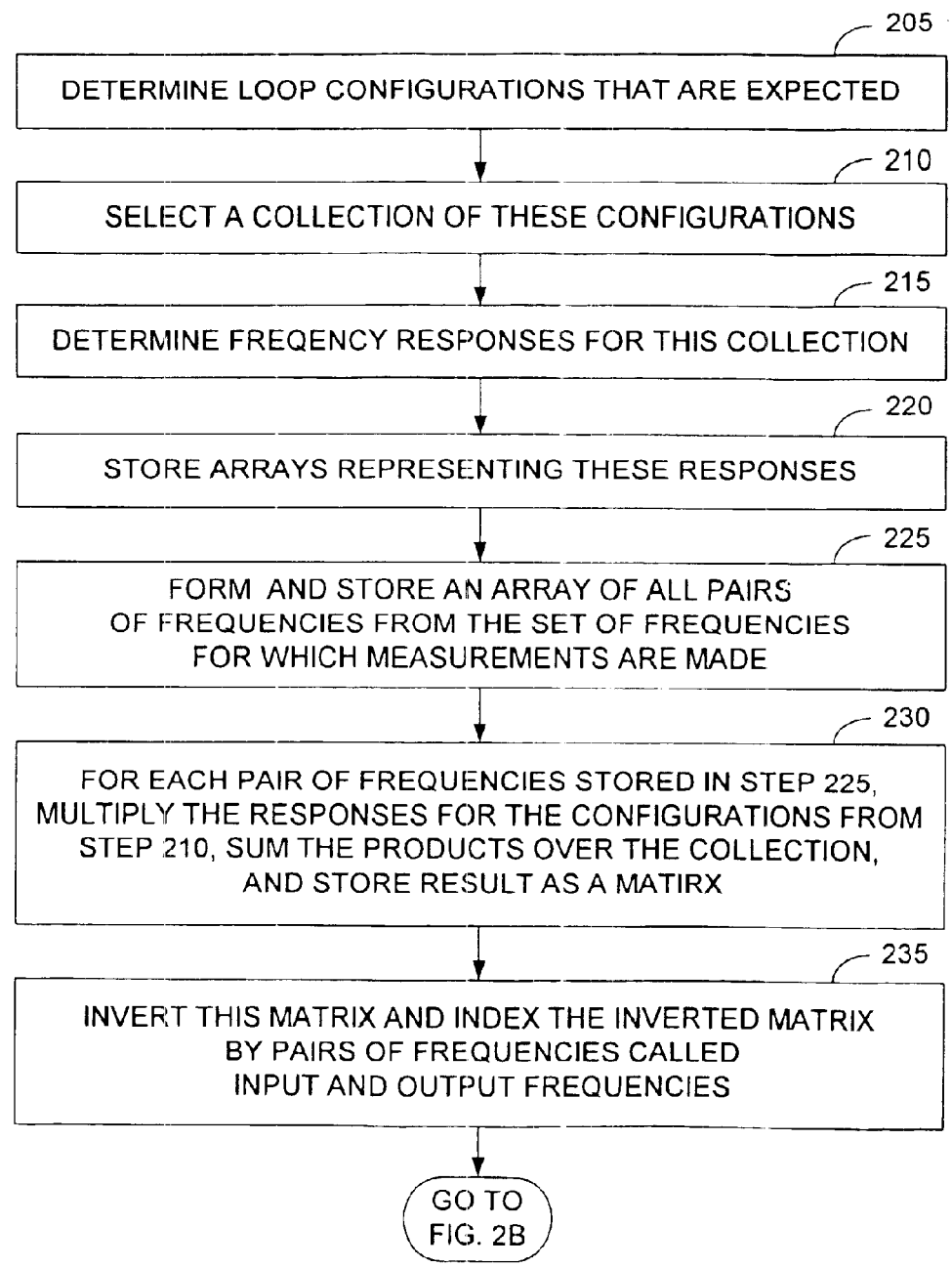

_US 6,876,726 B1_

Figure 1:
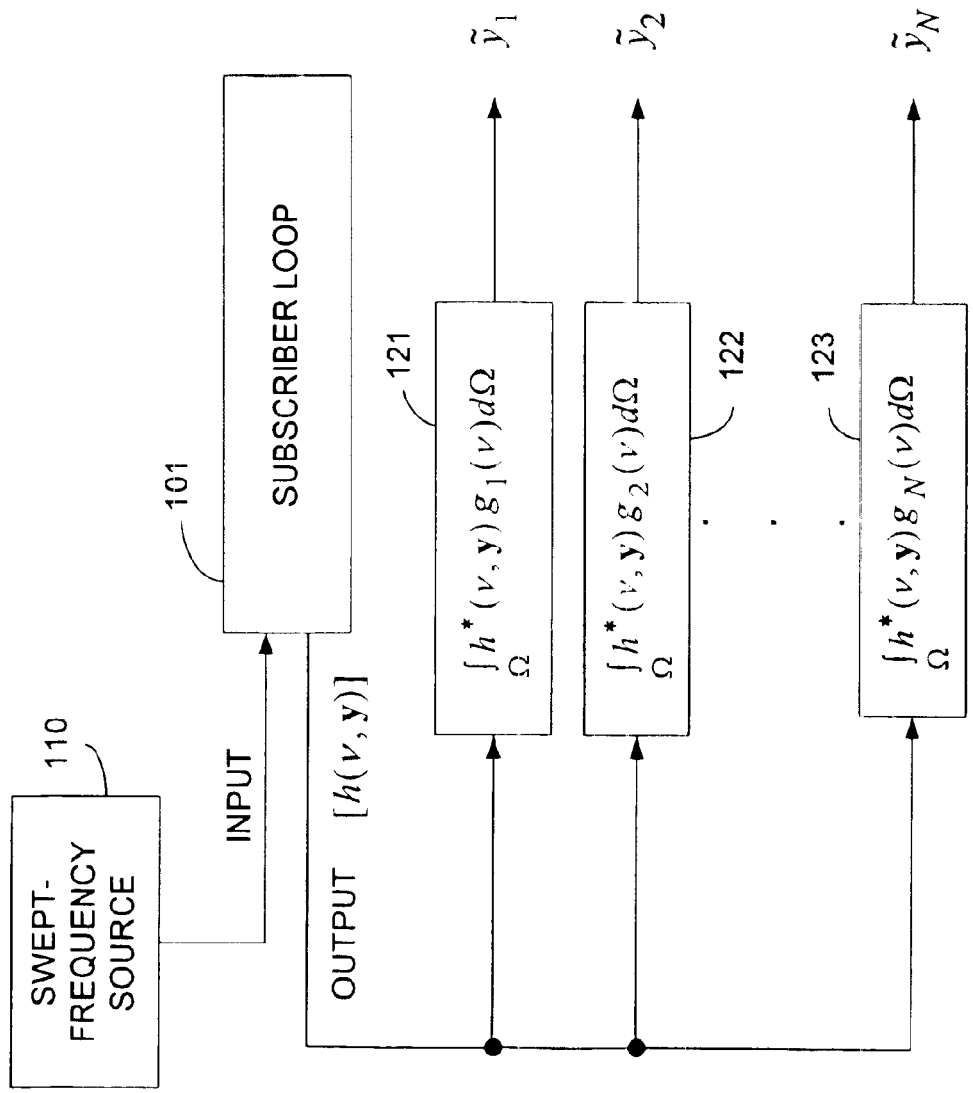

DETERMINING THE COMPOSITION OF PHYSICAL STRUCTURES FROM BOUNDARY MEASUREMENTS, INCLUDING THE COMPOSITION OF SUBSCRIBER LOOPS

CROSS-REFERENCE TO RELATED APPLICATION

This application is a non-provisional application of provisional application Ser. No. 60/158,156 filed Oct. 8, 1999.

BACKGROUND OF THE INVENTION

1. Field of the Invention

This invention relates to physical systems identifiable via configuration parameters and, more particularly, to methodologies and concomitant systems for determining the composition of the physical system via measurements at system boundaries, including determining the composition of subscriber loops.

2. Description of the Background Art

There has been considerable recent interest in the development of techniques to determine the composition of physical structures from measurements of the physical structure at boundary points of the structure. Representative of the technology applied to the imaging of objects, such as tumors or masses, in the human body, is the technique reported in U.S. Pat. No. 5,747,810 issued to Schotland and entitled "Simultaneous Absorption and Diffusion Tomography System and Method Using Direct Reconstruction of Scattered Radiation." As disclosed, the method for the direct reconstruction of an object from measurements of the transmitted intensity of diffusively scattered radiation is effected by irradiating the object with a source of continuous wave radiation. The transmitted intensity is related to the absorption and the diffusion coefficients of the object, which effectively determine or define the object, by an integral operator. The image of the object is directly reconstructed by executing a prescribed mathematical algorithm, as determined with reference to the integral operator, on the transmitted intensity of the diffusively scattered radiation.

With respect another class of physical structures, namely telephone subscriber loops, wherein a loop typically connects a customer with a local telephone central office and is composed of lengths of cable such as, for example 26 gauge or 24 gauge cable, there has been considerable interest shown in devising a technique to determine the composition of a loop from so-called single-ended measurements in order to qualify such loops for high-speed digital transmission. It is especially desirable to estimate the configuration of a subscriber loop from measurements made at the input of the loop at the central office. For example, one might measure the complex input impedance of the loop in the frequency domain or the time-domain echo at the input to the loop. From these measurements, the composition of the loop is estimated using identifiable characteristics in the response, such as peaks of return signals or time intervals between peaks in the response signal (generally referred to as "time domain reflectometer" approaches). Moreover, based upon estimates of the loop configuration from these measurements, it is further possible to estimate the transmission characteristics of the loop to the customer end.

SUMMARY OF THE INVENTION

These shortcomings, as well as other limitations and deficiencies are obviated, in accordance with the present invention relating to the composition of physical structures, for which a subscriber loop is representative, by devising explicit inversion formulae for determining the composition of the physical structure in terms of a parameter or configuration space. This approach, when applied to loops, allows the separation of loop make-up into parameters such as length of a cable section and its corresponding gauge.

In accordance with a broad method aspect of the present invention, a method for determining configuration parameters describing a physical system includes: (a) measuring an output signal from the system in response to an input signal, the output signal being related to the configuration parameters by a linear operator; and (b) directly reconstructing each of the configuration parameters by applying a prescribed mathematical algorithm to the output signal.

The broad system aspect of the present invention is commensurate with this broad method aspect.

BRIEF DESCRIPITON OF THE DRAWING

Figure 2B:
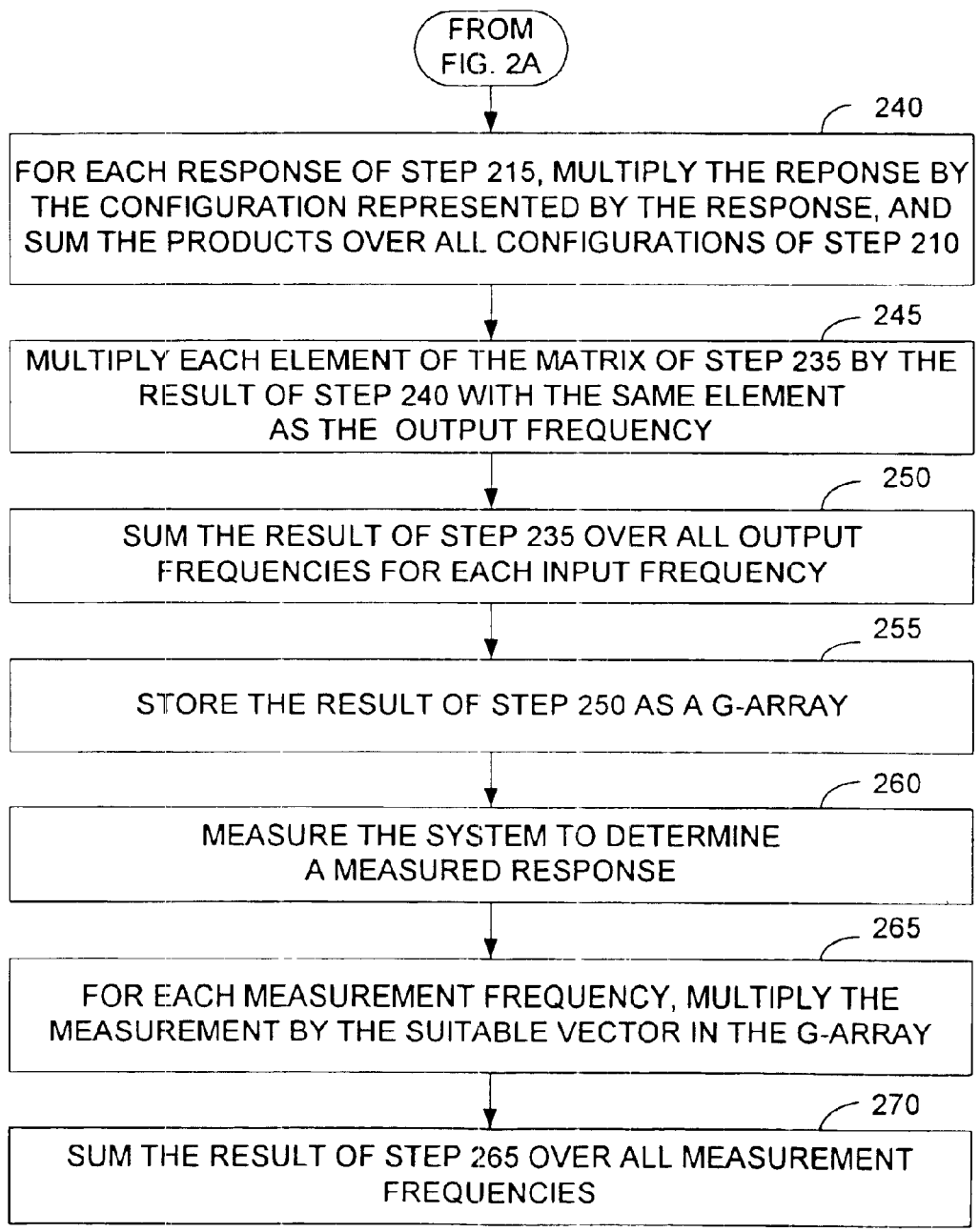
Figure 3:
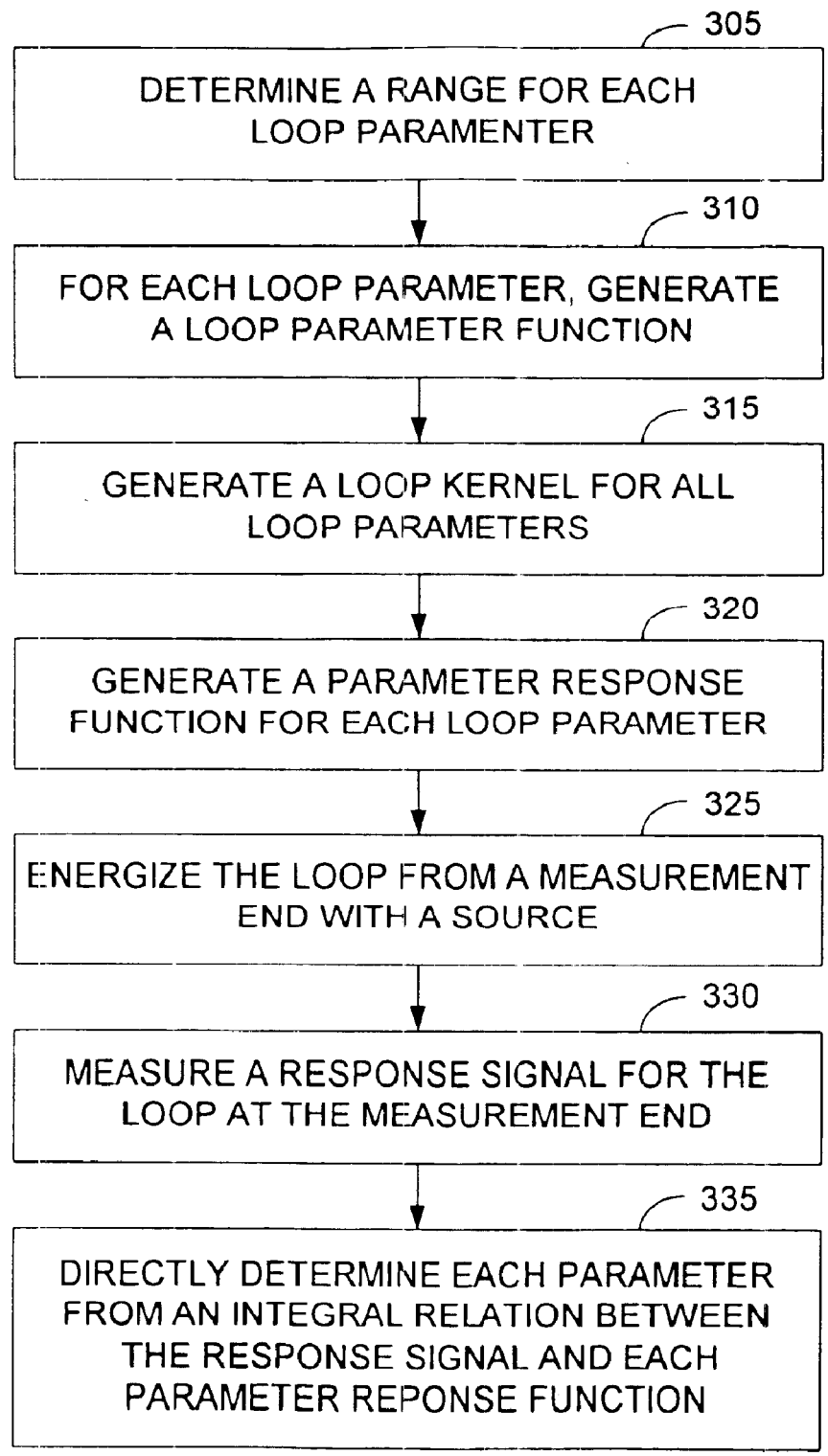

The teachings of the present invention can be readily understood by considering the following detailed description in conjunction with the accompanying drawings, in which;

FIG. 1 illustrates a high-level block diagram of system equipment to directly reconstruct configuration parameters, FIG. 2 illustrates an operational flow diagram to generate data for the methodology of the present invention, and FIG. 3 illustrates an operational flow diagram to generate data for the methodology of the present invention as applied to subscriber loops.

DETAILED DESCRIPTION

Function Theoretic Basis

Let x be a vector that defines the loop configuration; its components are the lengths of the various nominally uniform segments of the loop, such as main sections of constant gauge and no bridged tap, bridged taps of constant gauge, and so forth. There may be other types of quantities that are dimensions in the configuration space as well, such as the real part of a terminating impedance at a specified frequency. Some of the components of the configuration vector may be quantized, e.g., wire gauge. The complex input impedance of the loop might then be represented by $h(\omega,x)$. The following is a method of making estimates of x from $h(\omega,x)$, whatever it represents, in the form $$\tilde{x} = \int_\Omega h(\omega, x) g(\omega) d\omega \qquad (1)$$

where $\tilde{x}$ is the estimated configuration vector, $g(\omega)$ is a function that is determined herein and $\Omega$ is the domain over which measurements are made.

The technique that is illustrated for frequency domain measurements is then generalized to a general class of near-end measurements that includes time-domain measurements. Approximation methods are also discussed. In addition, it is recognized that the technique revealed is generally applicable to a wide variety of system identification problems.

2. Estimating the Configuration Using Measurements in the Frequency Domain.

We consider the response function, $h(\omega,x)$, as the kernel of an integral operator that maps functions on the space of configuration vectors onto functions of the frequency. Thus, we can write a transform of the form $$\hat{f}(\omega) \int_X h^*(\omega, x) f(x) dX \quad (2)$$

where the asterisk indicates the complex conjugate, dX is an elemental volume in configuration space, $$\int_X dX$$

is an integral over the whole configuration space, and $\hat{f}(\omega)$ is the transform of $f(x)$. Now, consider the integral operator with kernel $K(v,\omega)$ defined by $$K(v, \omega) = \int_X h(v, x) h^*(\omega, x) dX \quad (3)$$

This is a positive definite kernel because there can be no function $f(x)$ that has a zero transform because of causality. Consequently, the kernel can be inverted on the class of functions given generically by equation (2), and the result may be applied to equation (2) to yield $$\hat{f}(v) = \int_\Omega K^{-1}(v, \omega) \int_X h(\omega, x) f(x) dX d\Omega \quad (4)$$

with $K^{-1}(v,\omega)$ is the kernel of the integral operator that is the inverse of the operator with kernel $K(v,\omega)$, and there are some other some obvious definitions. The domain of integration in equation (4), viz., $\Omega$, might, for example, be a convenient pass-band of frequencies, symmetric about zero but with a gap that includes 0 (DC) on the real frequency line. A pass-band might be chosen to avoid the low-frequency distortion that is inherent in copper cables. The integral operator with kernel $K(v,\omega)$ is compact, so that its spectrum has a limit point at zero. Consequently, the inverse may have to be generalized to avoid the exigencies of measurement imprecision and noise.

If we now multiply both sides of equation (4) by $h(v,y)$ we get $$f(y) = \int_\Omega \int_\Omega \int_X h^*(v, y) K^{-1}(v, \omega) h(\omega, x) f(x) dX d\Omega d\Omega \quad (5)$$

because the operator that acts on $f(x)$ on the right is a projection operator. To apply equation (5) to the case at hand suppose, for example, that $f(x)$ is the configuration vector, x, and that $h(v,y)$ is the result of measurement on a loop with configuration vector y. Then equation (5) yields $$\tilde{y} = \int_\Omega h^*(v, y) g(v) d\Omega \quad (6)$$

where $\tilde{y}$ is an estimate of the configuration vector and $$g(v) = \int_X \int_\Omega K^{-1}(v, \omega) h(\omega, x) x dX d\Omega \quad (7)$$

Equation (6) is interpreted as follows: the configuration vector can be found by taking the inner product of the results of the frequency domain measurements with the predetermined function $g(v)$. A discussion of the relationship between $\tilde{y}$ and y is given in the sequel.

Application of this result is illustrated FIG. 1. In the system of FIG. 1, subscriber loop 101 is driven by swept frequency source 110. (Source 110 may actually be a sequence of measurements that are made at a discrete set of frequencies, in which case, the integrations in the above that are over frequency should be replaced by summations.) Source 10 might, for example, be a controlled current source; the response or output signal, shown as $h(v,y)$, might be the input voltage to the line. In effect, the measurement setup determines the complex driving point impedance at the input to the loop.

The functions $g_k(v)$ would either be determined in advance of measurement, or could be calculated and stored in a processor (not shown) at the time of measurement using stored characteristic transmission data on wire-pair cables. Alternatively, the test system might be linked to a back-end or remote computer that would conduct such calculations and then relay results to the test system. In either event, interpolation might be needed between stored or computed values of $g_k(v)$ to obtain values that can be used with the measured values of the system response.

Integration is carried out by processors 121, 122, ..., 123 to provide the estimates of the configuration parameters of vector $\tilde{y}$.

3. Generalization of the Estimation Technique

The technique that was elucidated in section (2) can, in an obvious way, also be applied to measurements of responses that are made in the time domain. All that is required is to think of the variables considered as frequencies in section (2) should be considered as times and to make other obvious adjustments, mutatis mutandis. In fact, the results of section (2) can be made generic to any type of measurement that will represent a one-to-one map of the configuration space.

To the end of developing a generic formula for estimation of a loop configuration vector, define $h(x)$ as the vector or function quantity that is measured when the loop configuration vector is x. Then, define the operator H on all scalar functions on the space of configuration vectors, X, by $$Hf = \int_X h(x) f(x) dX \quad (8)$$

where f is a vector notation for the scalar function on X. Note that f may be generalized in an obvious way to have several scalar-function components. To exemplify, the configuration vector itself is one such multi-component function.

Now, form the operator $$P = \tilde{H}(H\tilde{H})^{-1} H \quad (9)$$

As in section (2), a generalized inverse of $H\tilde{H}$ may be required. P is obviously a projection operator, (because it is idempotent and symmetric) so that for any $f \in f(X)$, $$Pf=f \quad (10)$$

In equation (10), we tacitly assume that f lies in the range of the projection operator. Consequently, if we wanted to use the measurements of the loop, i.e., $h(x)$ to determine the value of an arbitrary function, say the scalar function $f(X)$, for the loop, we would a priori calculate $$g_f=(H\tilde{H})^{-1} Hf \quad (11)$$

where, in this instance, $f=f(X)$. Then we would use the measurement of the loop, viz., $h(x)$, to calculate $f(x)$, using equation (9):

$$f(x)=(h(x),g_f)=\tilde{H}(H\tilde{H})-1Hf \qquad (12)$$

What equation (12) does for a scalar function can, as indicated above, be done for several scalar functions so that vector functions can be resolved in this way. In particular, the vector function x can be treated in this way since it is a finite-dimensional function in the configuration space. Thus, we can define a vector function $g_x$ by $$g_x=(H\tilde{H})^{-1}Hx \qquad (13)$$

Then, if the measurement result is h(y), as it would be on a loop with configuration vector y, the estimate of the configuration vector would be $$\vec{y}^1=(h(y),g_x)=\tilde{H}(y)H\tilde{H})-1Hx \qquad (14)$$

It should be noted that the technique that has been described above and is described in the sequel is applicable to linear operators H that are more general than the integral operator given in equation (8) and, in fact, the technique described herein is more general than resolution of a telephone subscriber's loop configuration. Thus, what is described is applicable to a wide variety of situations where measurements are made on a system that depends on the system configuration and it is desired to estimate the configuration of the system from the measurements.

4. Determining the Inverse Appearing in (14)

One way to determine the inverse of $H\tilde{H}$ uses a singular value decomposition, i.e., solve the eigenvalue problem $$H\tilde{H}\phi_n=\lambda_n\phi_n \qquad (15)$$

Then, when operating on vector quantities of the form Hf, H $\tilde{H}$ is non-singular and has the generic form $$(H\tilde{H})^{-1}Hf = \sum_{n=1}^{\infty} \phi_n \frac{(\phi_n, f)}{\lambda_n} \qquad (16)$$

The summation in equation (16) may be truncated, as appropriate for practical computation purposes. Also, this is not the only way that $H\tilde{H}$ can be inverted.

We can also use the singular value decomposition to represent H and its transpose. Thus, if $$\tilde{H}\phi_n=\Psi_n \qquad (17)$$

it is apparent that $$\phi_n = \frac{H\psi_n}{\lambda_n} \qquad (18)$$

so that we can write $$Hf = \sum_{n=1}^{\infty} \phi_n \frac{(\psi_n, f)}{\lambda_n} \qquad (19)$$

Again, truncating the summation may be used as an approximation, in accord with using a generalized inverse of $H\tilde{H}$.

Another way of determining the inverse of the operator might be simply to represent the operator in some finite dimensional function space as a matrix. Then, the inverse could be found using a computer routine that inverts the matrix. Using measurements made at a discrete set of frequencies, as would be done in any computer program, would be an example of such an approach.

5. Some Applications

A. Time Domain Measurements

One could use the results of a time-domain reflectometer measurement in the above procedure. Another way to use time domain measurements is by means of an adaptive echo canceller at the input to the loop. The echo canceller settings that the canceller adapted to would be the data that is used in the above. For the purposes of illustration, we will assume here that the time-continuous echo is available as a response, so that the response function is $$h(x)=e(t,x) \qquad (20)$$

where e(t,x) is the echo, at time t, from a loop with configuration vector x, when the loop is driven by a pulse of prescribed shape, e.g., a raised cosine pulse. The space that the response lies in is now the space of square integrable functions on the positive, semi-infinite, time line. The inner product between two elements, f and g, denoted by (f,g), is given by $$(f,g)=\int_0^\infty f(t)g(t)dt \qquad (21)$$

Note that the upper limit on the integration in (21) is infinite; in practice, this would be a finite upper limit, making the dimension of the space of functions considered denumerably infinite. Furthermore, from a computational point of view the function space must be finite-dimensional.

The operator H is given by $$Hf(x) = \int_X e(t, x)f(x)dX \qquad (22)$$

so that Hf may be viewed as a superposition of infinitesimal echoes {f(X)dX}. The operator $H\tilde{H}$ is just an integral operator with domain and range the space of functions that are square-integrable on the positive semi-infinite time line, and with kernel $$K(t, \tau) = \int_X e(t, x)e(\tau, x)dX \qquad (23)$$

If we denote the kernel of the generalized inverse of this operator by $K^{-1}(t,\tau)$, equation (23) becomes $$g_x = g_x(t) = \int_0^\infty \int_X K^{-1}(t, \tau)e(\tau, x)x\,dX\,d\tau \qquad (24)$$

and the estimated value of the configuration vector, given measurement e(t,y), would be $$\vec{y}^1 = \int_o^\infty e(t, y)g_n(t)dt \qquad (25)$$

It should be noted here that e(t,x) would be a scalar function in most applications, but that $g_x(t)$ is a finite-dimensional vector function of time, so that the configuration estimate is of the same dimension as e(t,x).

B. Sampled Configuration Space

In most applications it is not necessary to know the system configuration exactly so that the configuration space can be sampled or quantized. This does not change the fundamental character of the above considerations. The configuration sample values generate a finite collection of response functions that span the response space so that the general formulation of section (3) applies. The necessary modifications are only that integral operator become matrices and integrations become summations with a finite number of terms. However, it may be necessary to use generalized inverses of the involved matrices, possibly reducing the effective dimensionality of the measurement space and limiting the dimensionality of the possible configuration space.

C. Difference Responses

It may frequently happen that an approximation to the loop configuration can be made a priori. For example, a preliminary measurement may indicate that the loop is very long or that there is a bridged tap at some point on the line that is masking, to some extent, the effects of the configuration beyond the bridged tap. In this case, the response used in the above considerations can be the difference between a measurement of the actual loop and the reference measurement. This is, of course, similar to the idea of using a bridge to make measurements.

In another situation, we might expect that the loop configuration lies within a certain subset, $X_0$, of the overall configuration space. E.g., an initial loop measurement using a technique other than that revealed herein, might give an approximate volume in configuration space within which the loop configuration vector lies. We might then use that subset for the configuration space, rather than the whole configuration space, in the above discussed calculations, with a reference response being that of a loop with a configuration somewhere in the middle of the subset. The response function then used would be the difference between the actual measurement and the measurement that the reference configuration would yield.

Hence, suppose that there is a reference response, designated by $h_0$ and that the actual result of loop measurement is $h_1(x)$. Then, the response that would be used in the above calculations would be $$h(x) = h_1(x) - h_o \quad (26)$$

The theory developed above could then be applied using the h(x) on the left in equation (26). In fact, the operator H can now be written in the form $$Hf = \int_{X_o} h_1(x) f(x) dX - h_o \int_{X_o} f(x) dX \quad (27)$$

so that the $h_o$ part of the H operator has the effect of subtracting out the effect of the average of any function over the domain of integration. It must be remembered that the domain of integration in equation (27) might not be the whole set of possible configurations, but a smaller set, containing $h_o$, as ascertained by preliminary considerations. Now, the operator $H\tilde{H}$ takes the form $$H\tilde{H} = \int_{X_o} [h_1(x) - h_o][\tilde{h}_1(x) - \tilde{h}_o] dX \quad (28)$$

If we choose $h_o$ so that it is the average of $h_1(x)$ over the configuration set:

$$h_o \int_{X_o} dX = \int_{X_o} h_1(x) dX \quad (29)$$

Equation (28) assumes the simple form:

$$H\tilde{H} = \int_{X_o} h_1(x) \tilde{h}_1(x) dX - h_o \tilde{h}_o \int_{X_o} dX \quad (30)$$

In addition, the choice in equation (29) converts equation (27) to the form $$Hf = \int_{X_o} h_1(x) f(x) dX - h_o \frac{\int_{X_o} f(x) dX}{\int_{X_o} dX} = \int_{X_o} h_1(x) f(x) dX - h_o \langle f \rangle \quad (31)$$

where <f> is the average of the function f(x) over the set of configurations deemed feasible ($X_0$).

In the measurement process, a configuration specified by a vector y would, of course, have a result $h_1(y)$, and $h_0$ would have to be subtracted from the measurements in processing the data.

E. Iteration

It should be noted that this idea can be used as the basis of an iteration process that successively refines the estimate at each stage of the iteration. For example, one might use a smaller subset of the overall configuration space at each step of the iteration, with $h_0$ chosen in the middle of the progressively smaller subsets. The iteration process could be terminated when the norm of the difference between the measurement and the reference response was smaller than some predetermined value. Of course, this does not preclude the use of other iteration methods such as steepest descent methods.

F. Projection Annihilation

It may sometimes happen that the range of the projection operator given in equation (9) is a proper subspace of the domain of the projection. This might happen, for example, if generalized inverses of operators are used, as alluded to above. In this case some functions on the configuration space will be annihilated by the projection operator. Consequently, projecting the configuration vector function will result in a function on the configuration space that is not equal to the configuration vector, but a function of the configuration vector. This does not alter the feasibility of the above procedure as long as the dimensionality of the measurement space, i.e., the dimensionality of the vector measured, is greater than or equal to the dimensionality of the configuration space (not the dimensionality of the space of square-integrable functions on the configuration space). Suppose, for example that the dimensionality of the measurement space is equal to the dimensionality of the putative configuration space. Then, by the inverse function theorem the measurements can be inverted to determine the configuration vector under fairly general conditions. All that is needed is, in effect, a generalized graph of the measurements as a function of the configuration vector, which would serve as a look-up table at the time of measurement. To determine such a look up table it is only necessary calculate h(y) for each configuration vector y prior to measurement. Of course, only a finite number of such responses could be stored. However, interpolation could be used at the time of measurement.

G. Measurement Noise

Some noise is present in all measurements. The above procedures can easily be modified so that the result of processing is a best estimate of any function of the configuration vector in the presence of noise. This technique will now be outlined. Suppose that there is noise at the time of measurement so that what is measured is not h(x) but h(x)+D where n is a random noise vector with covariance operator N, defined by $$<(x,n)(y,n)>=(x,Ny) \quad (31)$$

for all x and y in response space. In equation (31), < > indicates expectation in the noise probability space and ( ) indicates inner product in response space. Next, let $g_f$ be a response space vector that estimates the value of a function, f(x), on the configuration space by linear filtering operation, so that the estimate of f(x), which we will denote by $\tilde{f}(x)$, is given by $$\tilde{f}(x)=(g_f,h(x)+n) \quad (32)$$

The mean-square error in this estimate, integrated over configuration space, is $$e=\int_X <[(g_f,h(x)+n)-f(x)][(g_f,h(x)+n)-f(x)]>dX \quad (33)$$

or $$e = (g_f, Kg_f) + (g_f, Ng_f)\int_X dX - 2\left(g_f, \int_X h(x)f(x)dX\right) + \int_X f^2(x)dX \quad (34)$$

Varying $g_f$ to minimize this error leads to $$\int_X (h(x)\tilde{h}(x)+N)dX g_f = \int_X h(x)f(x)dX \quad (35)$$

or, with an obvious definition, $$(K+N)\int_X dX g_f = \int_X h(x)f(x)dX \quad (36)$$

Thus, the introduction of noise into the measurement process modifies the procedures given above by adding the noise covariance matrix to the operator previously used to obtain $g_f$. This has an advantage when the K operator is compact so that its eigenvalues have zero as a limit point, as explained above. If the noise is white, the spectrum of the noise covariance operator is flat, so that the limit point of the spectrum of the operator K+N is strictly greater than zero, thus allowing the operator K+N to be inverted on the whole of the response space.

This suggests a method of iteration in the configuration resolution process. One can begin to resolve the configuration by assuming a relatively large amount of noise (even if no appreciable noise is actually present) so that relatively imprecise resolution is obtainable. This is tantamount to assuming a coarse-grained resolution, permitting rough estimation of the configuration vector as a first step. The putative noise might, in fact, be considered as the quantization noise inherent in the granularity of the resolution. Then, after the initial estimates using the technique of this section, the subset of configuration space that is considered possible can be restricted. Then, the putative noise level can be reduced to reflect the smaller domain of consideration and the method of this section can be reapplied. Continuation of this process leads to more and more refined estimates of the system configuration.

Operational Flow

The flow diagram of FIG. 2 depicts the steps of the operational flow presuming frequency measurements are made, as follows:

Flow Sequence for Frequency Measurements

Step 205—Define the subset of loop configuration space that is of interest, that is, determine which loop configurations are expected to be possible. This includes selecting which dimensions in the configuration space are relevant (cable lengths, bridged tap lengths, gauges, etc.)

Step 210—Select a finite collection of configurations within this subset so that the response for any configuration within the subset can be adequately approximated by a response from the selected finite collection.

Step 215—Determine the frequency responses, e.g., magnitude of driving point impedances at the loop input, of the configurations within the finite collection.

Step 220—Store the arrays representing the frequency responses.

Step 225—Form an array of all of the pairs of frequencies that can be formed from the set of frequencies for which measurements will be made.

Step 230—For each pair of frequencies stored in step 225, multiply the frequency responses for each configuration in the collection from step 210. Sum these products over all configurations from step 210. Store the result as a matrix.

Step 235—Invert the matrix found in step 230. The elements of this inverted matrix are indexed by pairs of frequencies, which are referred to as the input and output frequencies.

Step 240—For each frequency response determined in step 215, multiply the frequency response by the configuration vector that the response represents. Sum these products over all configuration vectors representing the configurations selected in step 210.

Step 245—Multiply each element of the matrix found in step 235 by the result of step 240 with the same frequency as the output frequency of the matrix element.

Step 250—Sum the result of step 235 over all output frequencies and for each input frequency.

Step 255—Store the result of step 250. Call the stored vector function of frequency the g-function array.

Step 260—Measure the loop to determine the measured frequency response.

Step 265—For each frequency at which measurements are made, multiply the result of measurement by the vector in the g-function array.

Step 270—Sum the results of step 265 over all measurement frequencies.

Operational Flow Example in Terms of General Subscriber Loop Parameters

The flow diagram in FIG. 3 depicts the following operational flow. The method for estimating a loop composition of a subscriber loop in terms of loop parameters $X_1, X_2, \ldots, X_i, \ldots, X_N$, the loop having a frequency-domain response $H(\omega, X_1, X_2, \ldots, X_i, \ldots, X_N)$ for the loop parameters, includes the following steps:

Step 305—determining a range for each loop parameter $X_i$,

Step 310—for each loop parameter $X_i$, generating a frequency-domain loop parameter function $F_{x_i}(\omega)$ wherein $$F_{x_i}(\omega) = \int_{x_1}\int_{x_2}\ldots\int_{x_i}\ldots$$
$$\int_{x_N} X_i H(\omega, X_1, X_2, \ldots, X_i, \ldots, X_N)dX_1 dX_2\ldots dX_i\ldots dX_N,$$

Step 315—generating a loop kernel $k(\omega,\beta)$ for all loop parameters wherein $$k(\omega, \beta) = \int_{x_1}\int_{x_2}\ldots$$
$$\int_{x_N} H(\omega, X_1, X_2, \ldots, X_N)H(\beta, X_1, X_2, \ldots, X_N)dX_1 dX_2\ldots dX_N,$$

Step 320—generating a parameter response function $g_i(\beta)$ for each loop parameter from the integral relation $$F_{x_i}(\omega) = \int_\beta k(\omega, \beta)g_i(\beta)d\beta,$$

Step 325—energizing the loop from a measurement end with an energy source,

Step 330—measuring a response signal $H_R(\omega)=H(\omega,X_1, X_2,\ldots,X_i,\ldots,X_N)$ for the loop at the measurement end, and Step 335—directly determining each loop parameter $X_i$ from the integral relation $$X_i = \int_\beta H_R(\beta)g_i(\beta)d\beta.$$

Example in Terms of Specific Subscriber Loop Parameters

The method for estimating a loop composition of a subscriber loop in terms of loop parameters such as the length of a cable section, denoted L, and the two possible gauges for the cable section, denoted G1 and G2, the loop having a frequency-domain response $H(\omega,L,G1,G2)$ for the loop parameters, includes the following steps:

(a) determining a range for each loop parameter L, G1, and G2, (b) for each loop parameter L, G1 and G2, generating a frequency-domain loop parameter function $$F_L(\omega) = \int_L\int_{G1}\int_{G2} LH(\omega, L, G1, G2)dLdG1dG2,$$
$$F_{G1}(\omega) = \int_L\int_{G1}\int_{G2} G1H(\omega, L, G1, G2)dLdG1dG2, \text{ and}$$
$$F_{G2}(\omega) = \int_L\int_{G1}\int_{G2} G2H(\omega, L, G1, G2)dLdG1dG2$$

(c) generating a loop kernel $k(\omega,\beta)$ for all loop parameters wherein $$k(\omega, \beta) = \int_L\int_{G1}\int_{G2} H(\omega, L, G1, G2)H(\beta, L, G1, G2)dLdG1dG2,$$

(d) generating parameter response functions $g_L(\beta)$, $g_{G1}(\beta)$ and $g_{G2}(\beta)$ from the integral relations $$F_L(\omega) = \int_\beta k(\omega, \beta)g_L(\beta)d\beta, F_{G1}(\omega) = \int_\beta k(\omega, \beta)g_{G1}(\beta)d\beta, \text{ and}$$
$$F_{G2}(\omega) = \int_\beta k(\omega, \beta)g_{G2}(\beta)d\beta$$

(e) energizing the loop from a measurement end with an energy source, (f) measuring a response signal $H_R(\omega)=H(\omega,L_R,G1_R,G2_R)$ for the loop at the measurement end where $L_R$, $G1_R$, and $G2_R$ are in or proximate to each range specified in step (a), and (g) directly determining each loop parameter L, G1, and G2 from the integral relations $$L = \int_\beta H_R(\beta)g_L(\beta)d\beta, G1 = \int_\beta H_R(\beta)g_{G1}(\beta)d\beta, \text{ and}$$
$$G2 = \int_\beta H_R(\beta)g_{G2}(\beta)d\beta.$$

Although various embodiments which incorporate the teachings of the present invention have been shown and described in detail herein, those skilled in the art can readily devise many other varied embodiments that still incorporate these teachings.

What is claimed is:

1. A method for estimating a loop composition of a subscriber loop in terms of loop parameters $X_1, X_2, \ldots, X_i, \ldots, X_N$ the loop having a frequency-domain response $H(\omega,X_1,X_2,\ldots,X_i,\ldots,X_N)$ for the loop parameters, the method comprising the steps of (a) determining a range for each loop parameter $X_i$;

(b) for each loop parameter $X_i$, generating a frequency-domain loop parameter function $F_{x_i}(\omega)$ wherein $$F_{x_i}(\omega) = \int_{x_1}\int_{x_2}\ldots\int_{x_i}\ldots$$
$$\int_{x_N} X_i H(\omega, X_1, X_2, \ldots, X_i, \ldots, X_N)dX_1 dX_2\ldots dX_i\ldots dX_N,$$

(c) generating a loop kernel $k(\omega,\beta)$ for all loop parameters wherein $$k(\omega, \beta) = \int_{x_1}\int_{x_2}\ldots$$
$$\int_{x_N} H(\omega, X_1, X_2, \ldots, X_N)H(\beta, X_1, X_2, \ldots, X_N)dX_1 dX_2\ldots dX_N,$$

(d) generating a parameter response function $g_i(\beta)$ for each loop parameter from the integral relation $$F_{x_i}(\omega) = \int_\beta k(\omega, \beta)g_i(\beta)d\beta,$$

(e) energizing the loop from a measurement end with an energy source, (f) measuring a response signal $H_R(\omega)=H(\omega,X_1,X_2,\ldots,X_1,\ldots,X_N)$ for the loop at the measurement end, and (g) directly determining each loop parameter $X_i$ from the integral relation $$X_i = \int_\beta H_R(\beta) g_i(\beta) d\beta.$$

2. The method as recited in claim 1 wherein step (e) includes the step of computing the inverse of $k(\omega,\beta)$.

3. The method as recited in claim 1 wherein step (e) includes the step of computing the inverse of $k(\omega,\beta)$ using singular value decomposition.

4. The method as recited in claim 3 wherein step (f) includes the step of filtering noise from the response signal.

* * * * *